United States Patent
Walker et al.

(10) Patent No.: US 11,942,880 B2
(45) Date of Patent: Mar. 26, 2024

(54) EASY HOLE START OPERATION FOR DRILLING POWER TOOLS

(71) Applicant: MILWAUKEE ELECTRIC TOOL CORPORATION, Brookfield, WI (US)

(72) Inventors: Woodrow W. Walker, Milwaukee, WI (US); Jonathan E. Schmitz, Wauwatosa, WI (US); Andrew T. Medeiros-Nicholson, Wauwatosa, WI (US); Bharat C. Nakum, Germantown, WI (US); Brittany Ann Sellnow, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 16 days.

(21) Appl. No.: 17/696,320

(22) Filed: Mar. 16, 2022

(65) Prior Publication Data
US 2022/0302857 A1 Sep. 22, 2022

Related U.S. Application Data

(60) Provisional application No. 63/161,728, filed on Mar. 16, 2021.

(51) Int. Cl.
*G05B 19/18* (2006.01)
*B23B 45/02* (2006.01)
(Continued)

(52) U.S. Cl.
CPC ............... *H02P 1/18* (2013.01); *B23B 45/02* (2013.01); *H02P 1/04* (2013.01); *B23B 2260/062* (2013.01)

(58) Field of Classification Search
CPC ...... H02P 1/18; H02P 1/04; H02P 1/46; B23B 45/02; B23B 2260/062; B23B 2270/32
See application file for complete search history.

(56) References Cited

U.S. PATENT DOCUMENTS 4,780,654 A 10/1988 Shoji et al.
5,357,179 A 10/1994 Abbagnaro et al.
(Continued)

FOREIGN PATENT DOCUMENTS

DE 3146339 C2 3/1984
DE 3926611 A1 2/1991
(Continued)

OTHER PUBLICATIONS

International Search Report and Written Opinion for Application No. PCT/US2022/020540 dated Jul. 4, 2022 (10 pages).

*Primary Examiner* — Muhammad S Islam
(74) *Attorney, Agent, or Firm* — Michael Best & Friedrich LLP

(57) ABSTRACT

A power tool, such as a drilling power tool, configured to perform an easy hole start operation upon actuation of a trigger. When the trigger is actuated, the motor is driven at a low speed value. The motor speed is increased to a second speed value during a predetermined time threshold and then driven at the second speed value until the trigger is no longer actuated. In some embodiments, the easy hole start operation may be implemented by an easy hole start switch. In some embodiments, if the easy hole start operation persists for a time greater than a predetermined time threshold, then the motor will shut off.

17 Claims, 11 Drawing Sheets

(51) Int. Cl.
*H02P 1/04* (2006.01)
*H02P 1/18* (2006.01)

(56) References Cited

U.S. PATENT DOCUMENTS

| | | |
|---|---|---|
| 6,697,570 B2 | 2/2004 | Hellmann et al. |
| 8,022,654 B2 | 9/2011 | Zhao et al. |
| 8,713,806 B2 | 5/2014 | Tokunaga et al. |
| 9,314,855 B2 | 4/2016 | Ookubo et al. |
| 9,950,417 B2 | 4/2018 | Ito et al. |
| 2016/0129576 A1 | 5/2016 | Nishikawa et al. |
| 2016/0200000 A1* | 7/2016 | Koslowski .............. B23B 51/04 173/1 |
| 2017/0170774 A1* | 6/2017 | Selfors .................. B24B 23/028 |
| 2018/0354108 A1* | 12/2018 | Lee ....................... B25B 23/147 |
| 2019/0047131 A1 | 2/2019 | Ishikawa et al. |
| 2019/0128474 A1* | 5/2019 | Sun ........................... B27B 9/00 |

FOREIGN PATENT DOCUMENTS

| | | | |
|---|---|---|---|
| JP | H09155612 A | | 6/1997 |
| JP | 2009050932 A | | 3/2009 |
| JP | 2012139752 A | * | 7/2012 |
| JP | 2012139752 A | | 7/2012 |
| WO | 2016116250 A1 | | 7/2016 |
| WO | 2020175007 A1 | | 9/2020 |
| WO | WO-2020175007 A1 | * | 9/2020 ............. B25D 11/00 |

\* cited by examiner

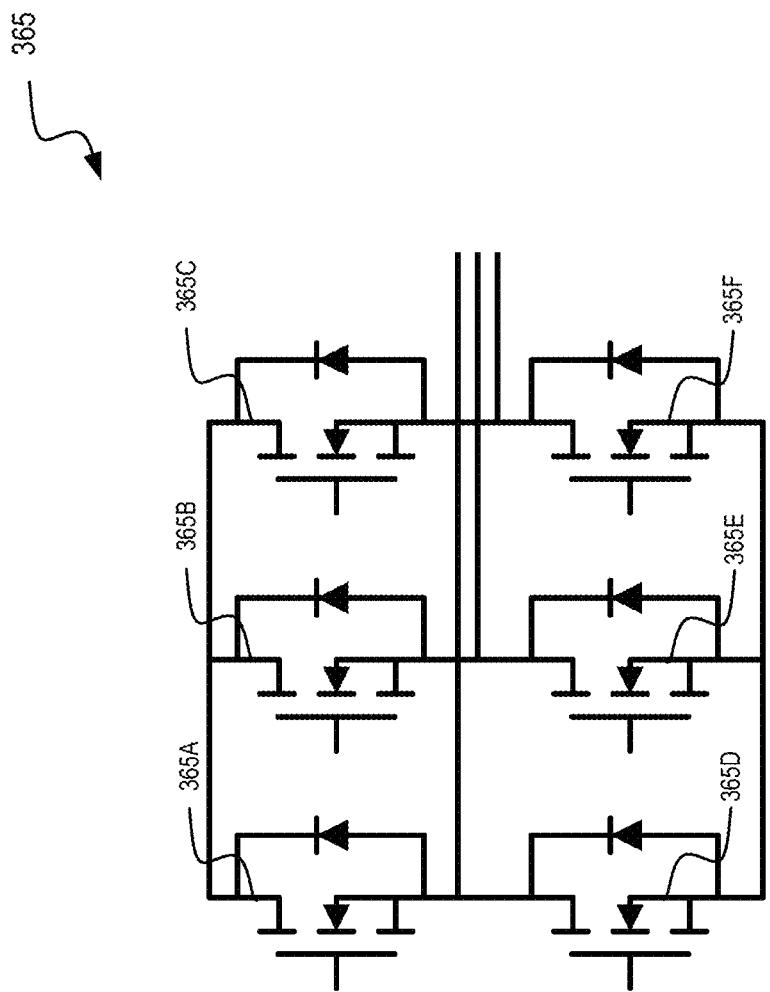

EASY HOLE START OPERATION FOR DRILLING POWER TOOLS

RELATED APPLICATIONS

This application claims the benefit of U.S. Provisional Patent Application No. 63/161,728, filed Mar. 16, 2021, the entire content of which is incorporated herein by reference.

SUMMARY

Drilling power tools (e.g., drill/driver, core drill, etc.) are conventionally controlled via a trigger. Upon actuation of the trigger, the motor outputs a torque to a tool (e.g., a drill bit), that performs an operation. A motor that outputs a high torque to the tool upon actuation of the trigger could cause a user to lose control of the drilling power tool.

Embodiments described herein provide an easy hole start for a drilling power tool. The power tool includes a housing, a motor within the housing, a battery pack interface configured to receive a battery pack and provide power to the motor, an actuator, and an electronic controller connected to the motor, the battery pack, and the actuator. The electronic controller is configured detect that the actuator has been actuated, drive the motor at a first speed, increase a speed of the motor from the first speed to a target second speed during a time interval, compare the speed of the motor to the target second speed of the motor, and turn off the power tool in response to the speed of the motor not reaching the target second speed of the motor during the time interval.

Embodiments described herein provide a method for controlling operation of a power tool. The method includes detecting, by a motor controller of the power tool, that an actuator of the power tool has been actuated, driving, by the motor controller, a motor of the power to at a first speed, increasing, by the motor controller, a speed of the motor from a first speed to a target second speed during a time interval, comparing, by the motor controller, the speed of the motor to the target second speed of the motor, and turning off, by the motor controller, the power tool in response to the speed of the motor not reaching the target second speed of the motor during the time interval.

Embodiments described herein provide an easy hole start for a drilling power tool. The power tool includes a housing, a motor within the housing, a battery pack interface configured to receive a battery pack and provide power to the motor, an actuator movably coupled to the housing, a switch coupled to the housing that is movable between a first position and a second position, and an electronic controller connected to the motor, the battery pack, and the actuator. The electronic controller is configured to detect that the switch is in the first position, detect that the actuator has been actuated, drive the motor at a first speed, increase the motor speed to a second speed during a predetermined time threshold, and drive the motor at the second speed.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIG. 5 illustrates the FET switching module of the circuit diagram of FIG. 4 in accordance with embodiments described herein.

DETAILED DESCRIPTION

Figure 1A:
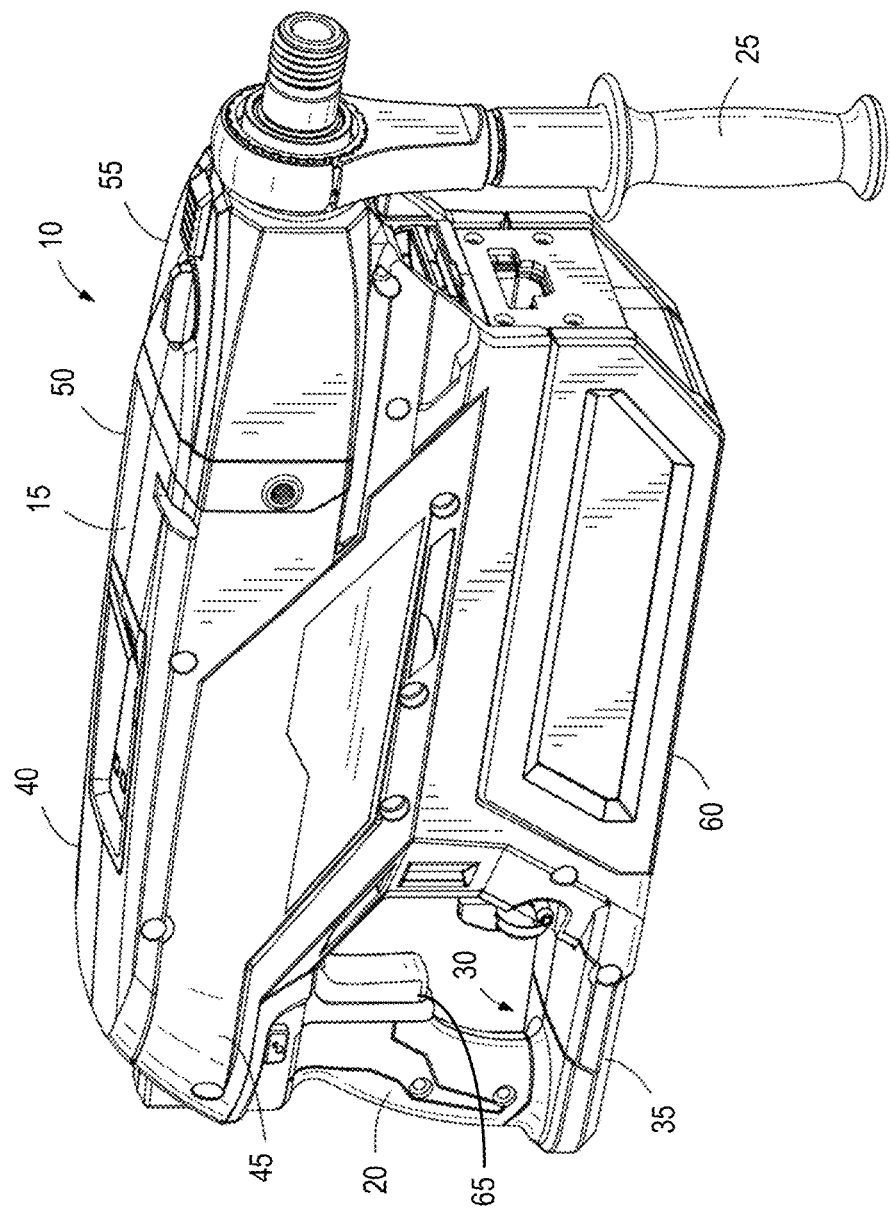
FIG. 1A illustrates a power tool in accordance with embodiments described herein.

FIG. 1A illustrates a rotary power tool, which is a core drill 10 in the illustrated embodiment. The core drill 10 includes a housing 15, a first or rear handle 20, and a second or auxiliary handle 25. A generally D-shaped gap 30 is defined between the rear handle 20 and the housing 15. The gap 30 provides clearance for a user's fingers when the user grasps the rear handle 20. In the illustrated embodiment, the rear handle 20 includes a base portion 35 at its lower end that extends to the housing 15. As such, the gap 30 is an aperture that is fully bounded about its perimeter by the rear handle 20, the base portion 35, and the housing 15. In other embodiments, the base portion 35 may not connect to the housing 15.

The illustrated housing 15 is a clamshell housing having left and right cooperating halves 40, 45 and includes a motor housing portion 50 and a drive housing 55. An electric motor (see FIG. 3) is mounted in the motor housing portion 50. The illustrated core drill 10 is cordless and includes a battery pack 60 that provides power to the motor. The battery pack 60 is removably coupled to a battery pack receptacle or battery pack interface, which is located underneath the motor housing portion 50 in the illustrated embodiment. In other embodiments, the core drill 10 may be a corded tool configured to receive power from a wall outlet or other remote power source. An actuator or trigger 65 is provided on the rear handle 20 and energizes the motor when depressed by a user. In some embodiments, the core drill 10 includes an easy hole start switch.

Figure 1B:
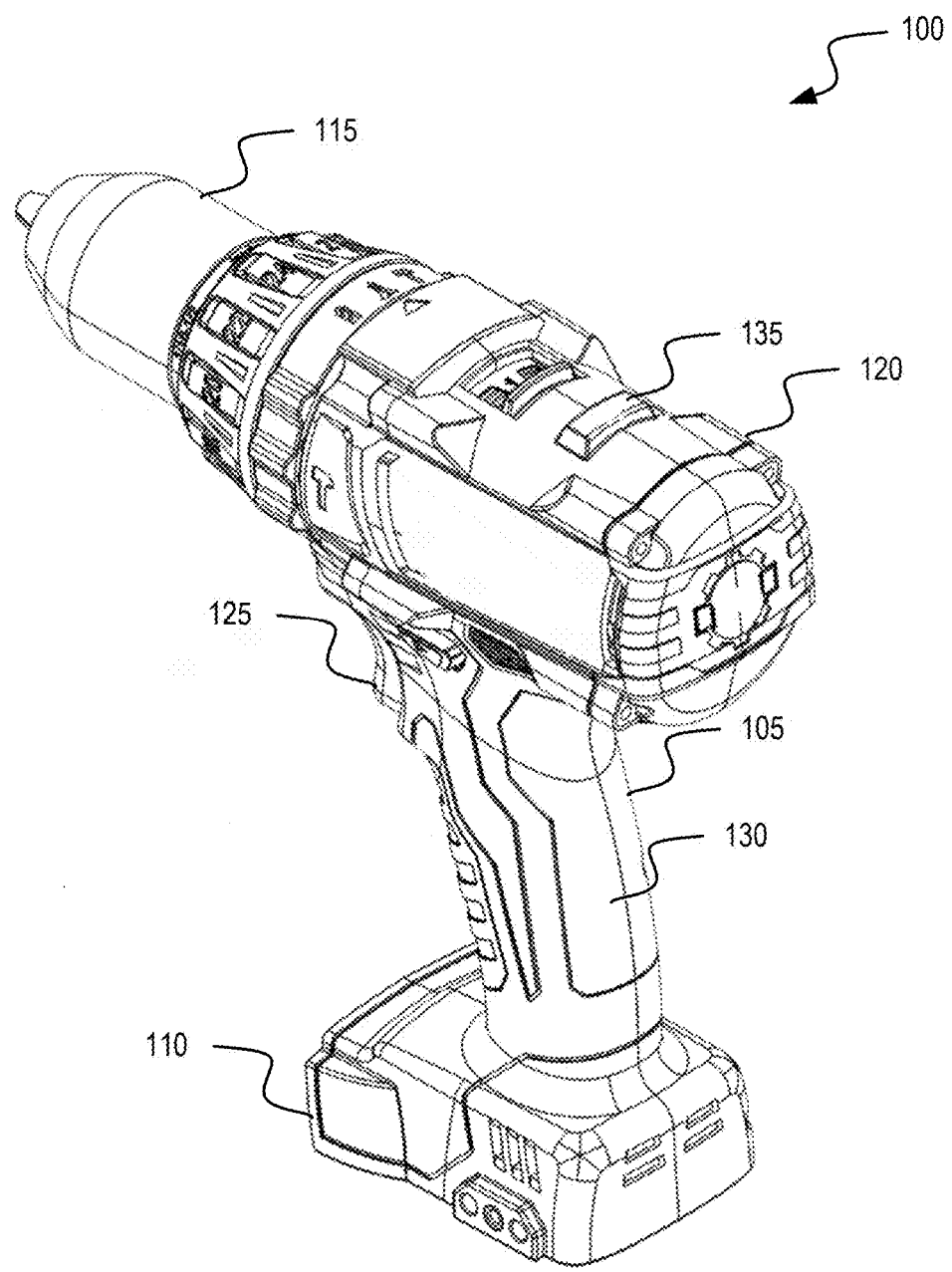
FIG. 1B illustrates a power tool in accordance with embodiments described herein.

FIG. 1B illustrates an example power tool 100 according to some embodiments. The power tool 100 includes a housing 105, a battery pack interface 110 configured to receive a battery pack, a driver 115 (e.g., a chuck or bit holder), a motor housing 120, an actuator or a trigger 125, a handle 130, and an easy hole start switch 135. The motor housing houses a motor 400 (see FIG. 3). A longitudinal axis extends from the driver 115 through a rear of the motor housing 120. During operation, the driver 115 rotates about the longitudinal axis. The longitudinal axis may be approximately perpendicular with the handle 130.

The easy hole start switch 135 may be a switch that moves between two positions, a switch that can be pressed to indicate an ON position and release to indicate an OFF position, etc. The easy hole start switch 135 may be configured to be switched to the ON position such that an easy hole start operation is enabled. The easy hole start operation will be described in detail below (see FIGS. 6A-8). In some embodiments, the easy hole start operation may be automatically enabled such that the actuation of the trigger 125 begins the easy hole start operation. While FIGS. 1A and 1B illustrate specific power tools 10, 100 with a rotational output, it is contemplated that the easy hole start operation described herein may be used with multiple types of power tools, such as other drills, drivers, powered screw drivers, powered ratchets, grinders, right angle drills, impact drivers, impact wrenches, rotary hammers, pipe threaders, or another type of power tool that experiences rotation about the longitudinal axis.

Figure 2:
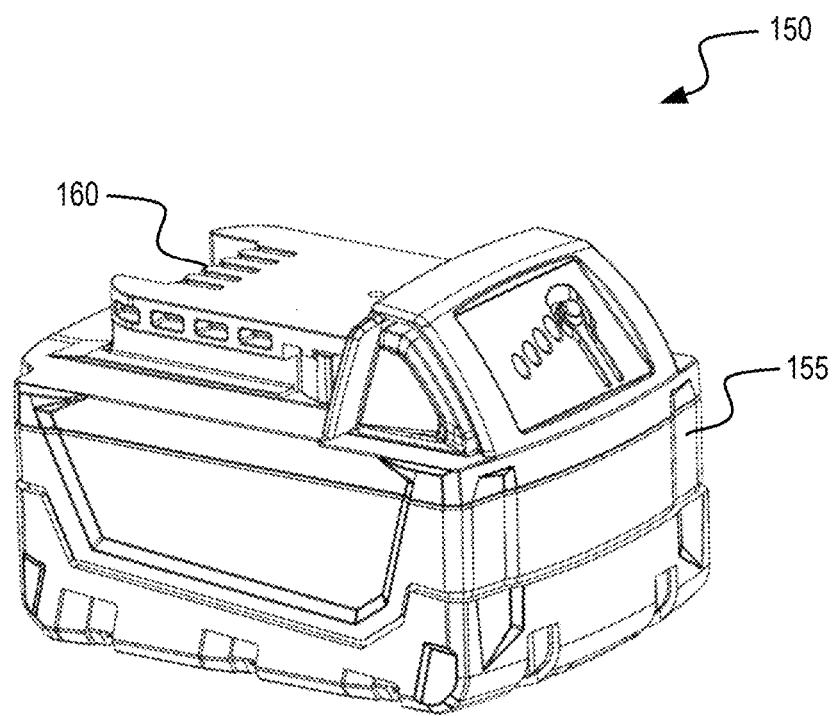
FIG. 2 illustrates a battery pack in accordance with embodiments described herein.

FIG. 2 illustrates a battery pack 150. The battery pack includes a housing 105 and a device interface portion 160 for connecting the battery pack 150 to a device (e.g., power tool 10, 100). The battery pack 150 includes a plurality of battery cells within the housing 105. The battery pack 150 provides current to the motor 400.

Figure 3:
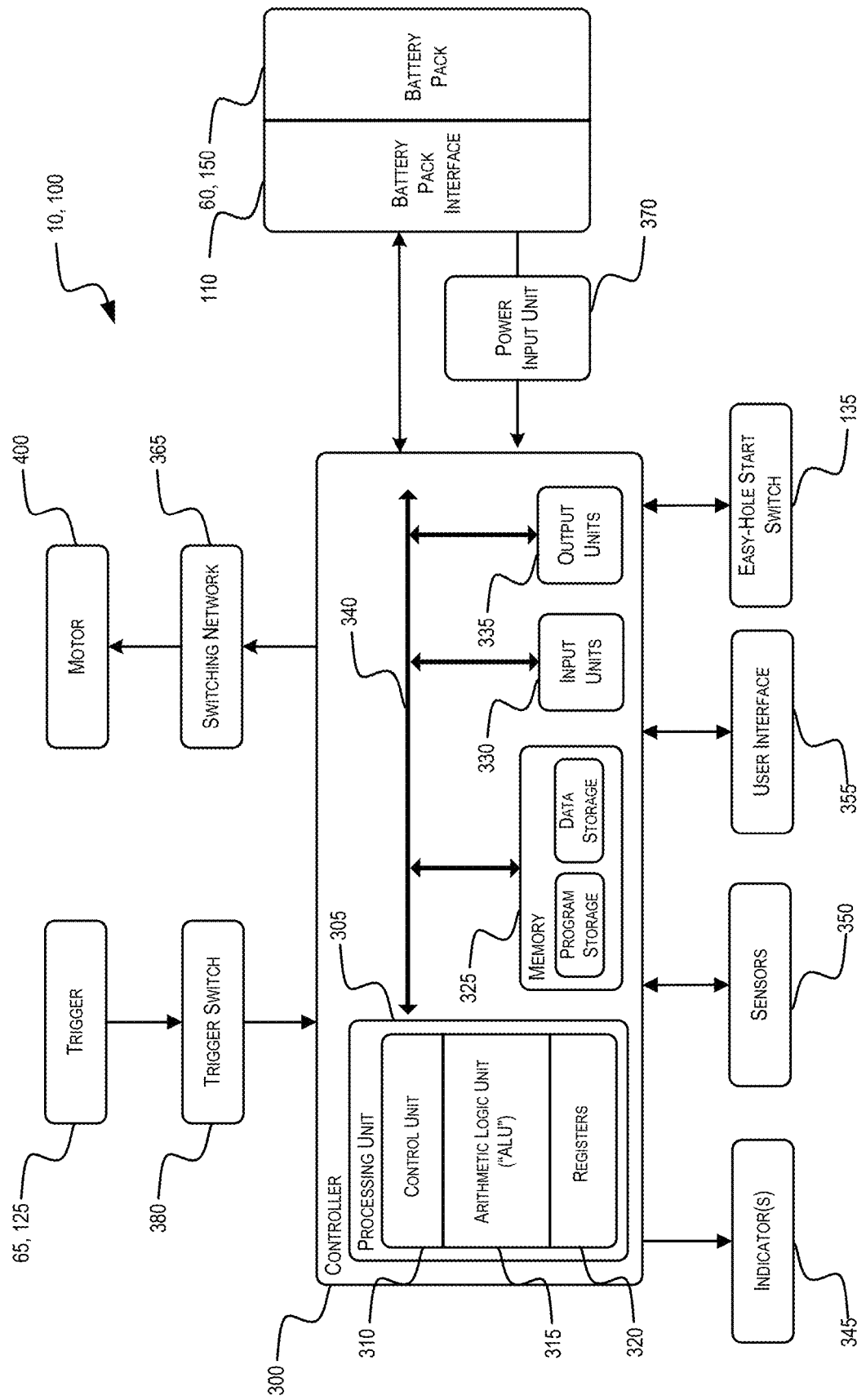
FIG. 3 illustrates a block diagram of a controller for the power tool of FIG. 1A or 1B in accordance with embodiments described herein.

A controller 300 for the power tool 10, 100 is illustrated in FIG. 3. The controller 300 is electrically and/or communicatively connected to a variety of modules or components of the power tool 10, 100. For example, the illustrated controller 300 is connected to indicators 345, sensors 350 (e.g., a current sensor, a voltage sensor, a speed sensor, a voltage sensor, a temperature sensor, an accelerometer, the proximity sensor 140, etc.), a user interface 355, the easy hole start switch 135, the trigger 125 (via a trigger switch 380), a power switching network 365, and a power input unit 370.

The controller 300 includes a plurality of electrical and electronic components that provide power, operational control, and protection to the components and modules within the controller 300 and/or power tool 10, 100. For example, the controller 300 includes, among other things, a processing unit 305 (e.g., a microprocessor, an electronic processor, an electronic controller, a microcontroller, or another suitable programmable device), a memory 325, input units 330, and output units 335. The processing unit 305 includes, among other things, a control unit 310, an arithmetic logic unit ("ALU") 315, and a plurality of registers 320 (shown as a group of registers in FIG. 3), and is implemented using a known computer architecture (e.g., a modified Harvard architecture, a von Neumann architecture, etc.). The processing unit 305, the memory 325, the input units 330, and the output units 335, as well as the various modules connected to the controller 300 are connected by one or more control and/or data buses (e.g., common bus 340). The control and/or data buses are shown generally in FIG. 3 for illustrative purposes. The use of one or more control and/or data buses for the interconnection between and communication among the various modules and components would be known to a person skilled in the art in view of the embodiments described herein.

The memory 325 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 305 is connected to the memory 325 and executes software instruction that are capable of being stored in a RAM of the memory 325 (e.g., during execution), a ROM of the memory 325 (e.g., on a generally permanent basis), or another non-transitory computer readable medium such as another memory or a disc.

Software included in the implementation of the power tool 10, 100 can be stored in the memory 325 of the controller 300. The software includes, for example, firmware, one or more applications, program data, filters, rules, one or more program modules, and other executable instructions. The controller 300 is configured to retrieve from the memory 325 and execute, among other things, instructions related to the control processes and methods described herein. In other embodiments, the controller 300 includes additional, fewer, or different components.

The battery pack interface 110 is connected to the controller 300 and is configured to couple with a battery pack 150. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 150. The battery pack interface 110 is coupled to the power input unit 370. The battery pack interface 110 transmits the power received from the battery pack 150 to the power input unit 370. The power input unit 370 includes active and/or passive components (e.g., voltage step-down controllers, voltage converters, rectifiers, filters, etc.) to regulate or control the power received through the battery pack interface 110 and to the controller 300. In some embodiments, the battery pack interface 110 is also coupled to the power switching network 365. The operation of the power switching network 365, as controlled by the controller 300, determines how power is supplied to the motor 400.

References herein are made with respect to the power tool 100, but can be similarly made with respect to the power tool 10. The controller 300 drives the motor 400 to rotate driver 115 in response to the user's actuation of the trigger 125. The driver 115 may be coupled to the motor 400 via an output shaft. Depression of the trigger 125 actuates a trigger switch 380, which outputs a signal to the controller 300 to drive the motor 400, and therefore the driver 115. The controller drives the motor 400 via control signals that include pulse width modulated (PWM) signals. In some embodiments, the controller 300 controls the power switching network 365 (e.g., a FET switching bridge) to drive the motor 400. For example, the power switching network 365 may include a plurality of high side switching elements (e.g., FETs) and a plurality of low side switching elements (e.g., FETs). The controller 300 may control each FET of the plurality of high side switching elements and the plurality of low side switching elements to drive each phase of the motor 400. When the trigger 125 is released, the controller 300 may apply a braking force to the motor 400. For example, the power switching network 365 may be controlled to more quickly decelerate the motor 400.

The controller 300 is configured to drive the motor 400 according to an easy hole start operation. During the easy hole start operation, the motor 400 rotates the driver 115 at a first or reduced speed. The motor 400 receives a reduced amount of power from the power switching network 365 (e.g., 10% power). In some embodiments, when the easy hole start switch 135 is in the ON position, the motor 400 receives reduced power and operates at a reduced speed. For example, the controller 300 may control the FETs of the power switching network 365 to supply power to the motor 400 with a reduced PWM duty cycle to drive the motor 400 at a reduced speed. In some embodiments, the controller 300 drives the motor 400 at the reduced speed until a predetermined time threshold or time interval (e.g., 120 seconds) is reached. In some embodiments, the controller 300 drives the motor 400 at the reduced speed and gradually increases the speed to a target speed value (e.g., full speed, a desired speed set by the user, etc.). In some embodiments, if the easy hole start operation persists until a predetermined time threshold (e.g., two minutes), the controller 300 may turn off the power tool 100, deenergize the motor 400, and/or apply the braking force to the motor 400 to stop the operation of the motor 400.

The easy hole start switch 135 controls the easy hole start operation of the power tool 100. The easy hole start switch 135 may be switched between an ON position and an OFF position by the user. In some embodiments, the easy hole start operation is automatically applied to the power tool 100 by the controller 300. In such embodiments, upon actuation of the trigger 125, the easy hole start operation is applied.

The user can set the reduced speed value, the target speed value, and the predetermined time threshold via the user interface 355. The user interface may be a touchscreen on the power tool 100, buttons on the power tool 100, a mobile device that communicates with the power tool 100 over a network, etc.

The indicators 345 are also connected to the controller 300 and receive control signals from the controller 300 to turn ON and OFF or otherwise convey information based on different states of the power tool 100. The indicators 345 include, for example, one or more light-emitting diodes (LEDs), a display screen, etc. The indicators 345 can be configured to display conditions of, or information associated with, the power tool 100. For example, the indicators 345 can display information relating to the charge state of the battery pack 150, such as the charging capacity. The indicators 345 may also display information relating to a fault condition, or other abnormality, of the power tool 100. In addition to or in place of visual indicators, the indicators 345 may also include a speaker or a tactile feedback mechanism to convey information to the user through audible or tactile outputs. In some embodiments, the indicators 345 display information relating to an easy hole start condition. For example, one or more LEDs are activated upon detection of the easy hole start switch 135 being in the ON position.

Figure 4:
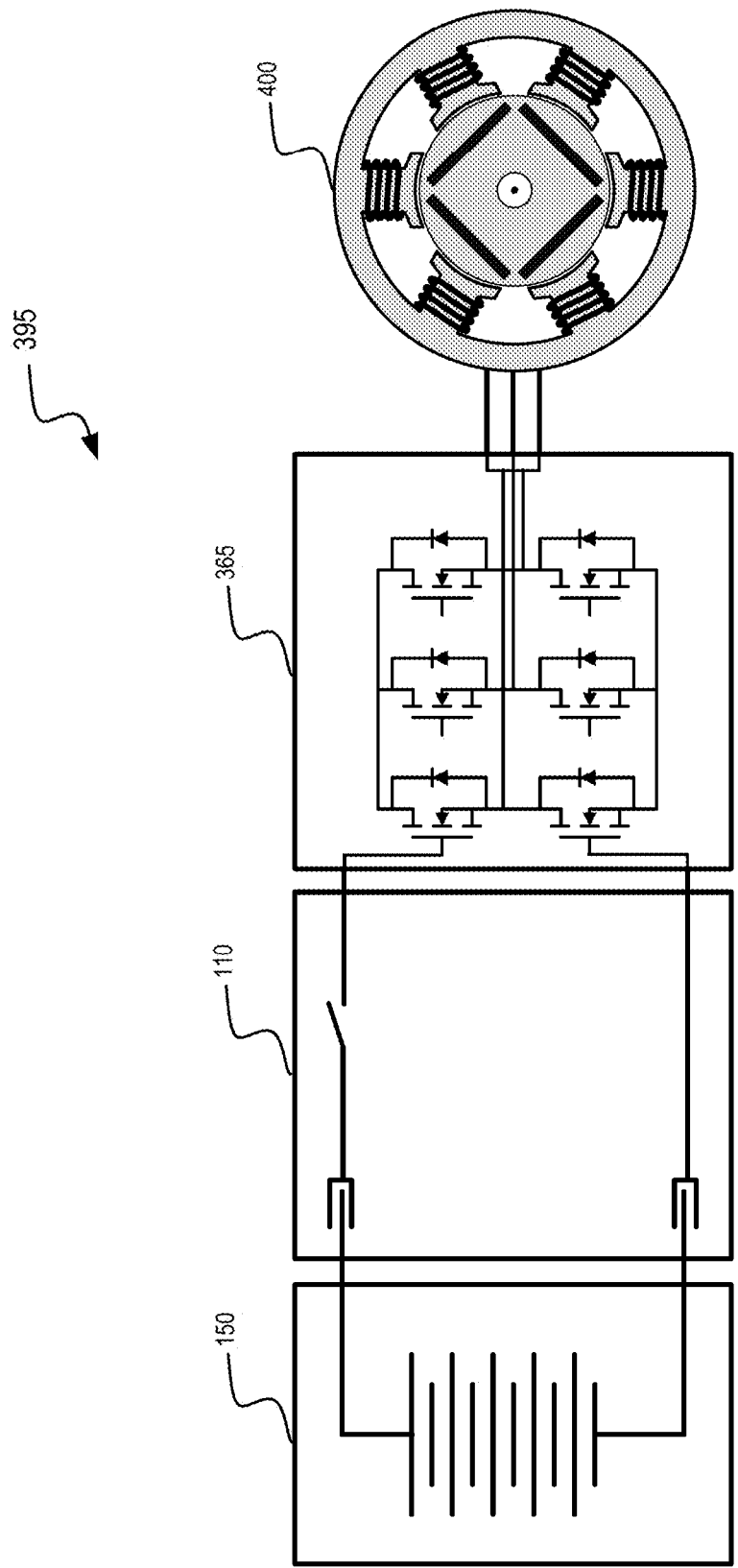
FIG. 4 illustrates a circuit diagram for a FET switching module according to embodiments described herein.

FIG. 4 illustrates a circuit diagram 395 of the power switching network 365. The power switching network 365 includes a number of high side power switching elements 365A, 365B, 365C and a number of low side power switching elements 365D, 365E, 365F (see FIG. 5). The controller 300 provides the control signals to control the high side FETs 365A, 365B, 365C and the low side FETs 365D, 365E, 365F to drive the motor 400 based on the easy hole start operation. For example, in response to detecting the easy hole start switch 135 being in the ON position and the trigger 125 being actuated, the controller 300 provides control signals to the FETs 365A, 365B, 365C and 365D, 365E, 365F to selectively enable and disable the FETs 365A, 365B, 365C and 365D, 365E, 365F to drive the motor 400 at a reduced speed (e.g., 10% of maximum speed). In some embodiments, once the motor 400 is driven at a reduced speed until a predetermined time threshold is reached, the controller 300 provides the control signals to selectively enable and disable the FETs 365A, 365B, 365C and 365D, 365E, 365F (e.g., sequentially, in pairs) to increase the speed of the motor 400 to a target speed (e.g., full speed, a desired speed set by the user, etc.).

More particularly, to drive the motor 400, the controller 300 enables a first high side FET 365A, 365B, 365C and first low side FET 365D, 365E, 365F pair (e.g., by providing a voltage at a gate terminal of the FETs) for a first period of time. In response to determining that a rotor of the motor 400 has rotated based on the sensors 350, the controller 300 disables the first FET pair, and enables a second high side FET 365A, 365B, 365C and a second low side FET 365D, 365E, 365F. In response to determining that the rotor of the motor 400 has rotated based on the sensors 350, the controller 300 disables the second FET pair, and enables a third high side FET 365A, 365B, 365C and a third low side FET 365D, 365E, 365F. This sequence of cyclically enabling pairs of high side FETs 365A, 365B, 365C and low side FETs 365D, 365E, 365F repeats to drive the motor 400. In some embodiments, the easy hole start operation is automatically applied when the trigger 125 is actuated. Further, in some embodiments, the control signals include pulse width modulated (PWM) signals having a duty cycle that is set in proportion to the amount of trigger pull of the trigger 125, to thereby control the speed or torque of the motor 400.

Figure 6A:
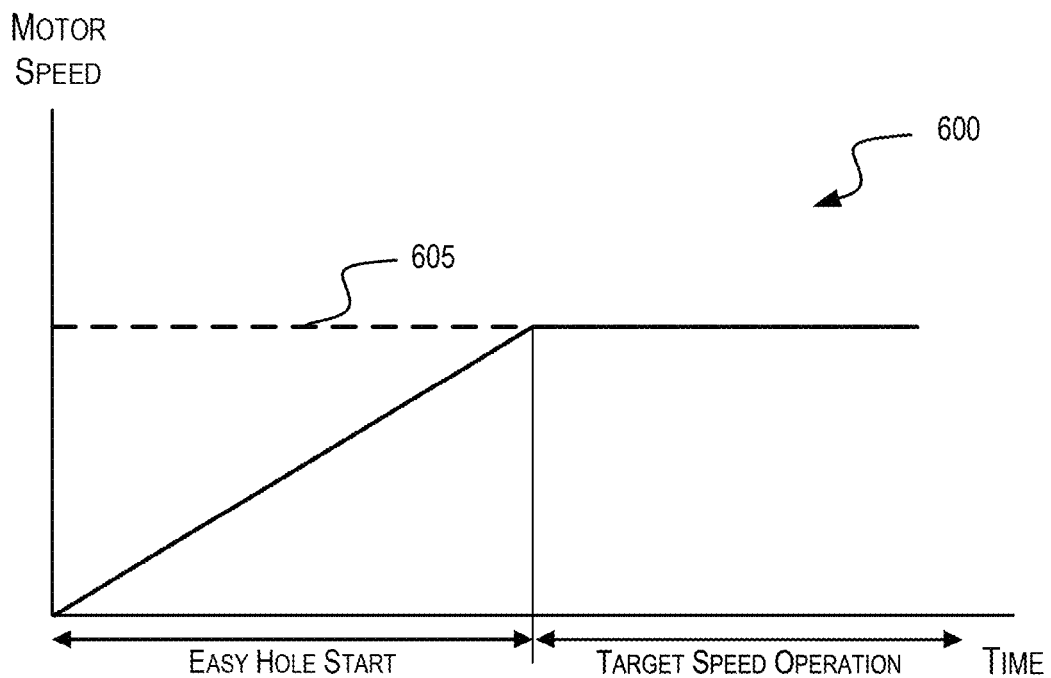
FIGS. 6A-6F illustrate graphs of an easy hole start operation implemented by the power tool of FIG. 1A or 1B.

FIGS. 6A-6F illustrates graphs of the easy hole start operation experienced by the power tool 100. FIG. 6A shows a linear relationship of motor speed with time during an easy hole start operation 600, according to some embodiments. Upon actuation of the trigger 125 of the power tool 100, the motor speed starts at a reduced speed value (e.g., 0%, 10% of full speed, etc.) and gradually increases at a linear rate until it reaches a target speed value 605 (e.g., full speed, a desired speed set by the user, etc.). When the motor speed reaches the target speed value 605, the easy hole start operation ends. The motor speed persists at the target speed value 605 during target speed operation until the trigger 125 is released. In some embodiments, the initial reduced speed value is settable or configurable (e.g., by a user). For example, the reduced speed value can be set to 15% of maximum speed. The power tool 100 quickly accelerates up to the reduced speed value and then gradually, linearly increases speed up to the target speed value 605.

Figure 6B:
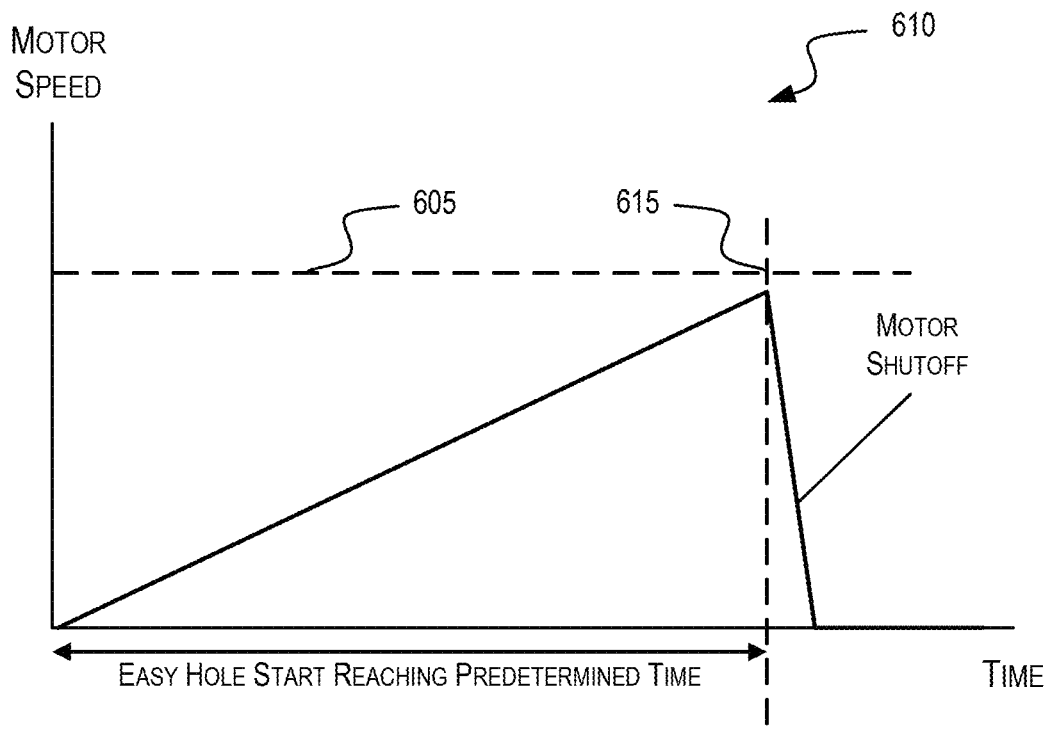

FIG. 6B shows a linear relationship of motor speed with time during an easy hole start operation 610, according to some embodiments. Upon actuation of the trigger 125 of the power tool 100, the motor speed starts at a reduced speed value (e.g., 0%, 10% of full speed, etc.) and gradually increases at a linear rate until reaching a predetermined time threshold 615 (e.g., 120 seconds). When the predetermined time threshold 615 is reached and the motor 400 has not reached the target speed value 605, the easy hole operation ends. For example, in response to reaching the predetermined time threshold 615, the motor 400 is shut off.

Figure 6C:
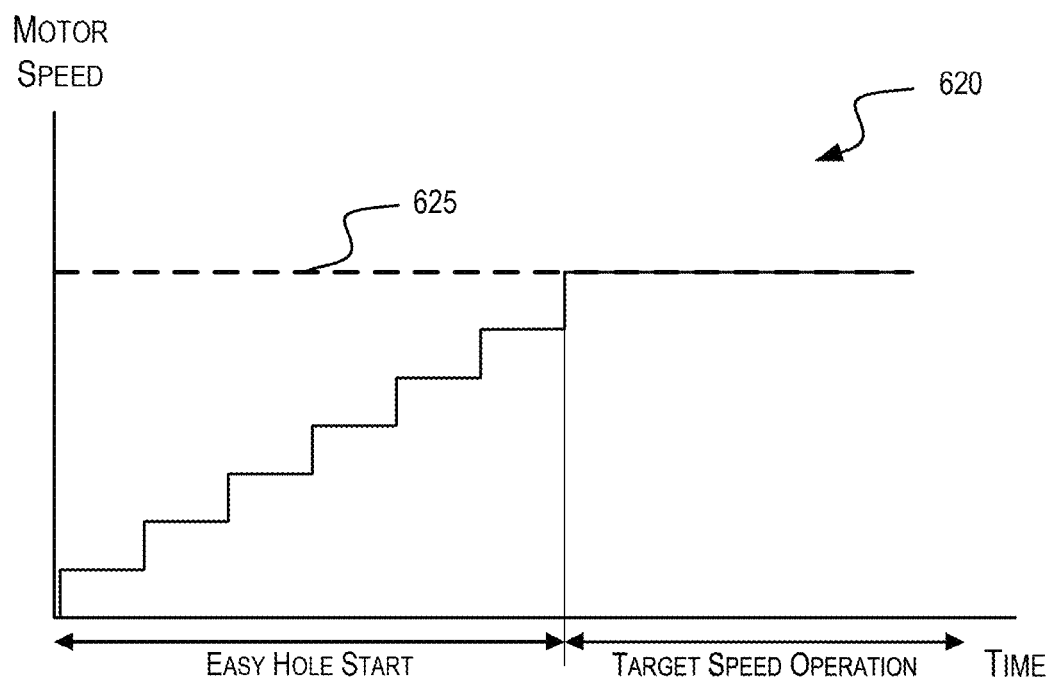
Figure 6D:
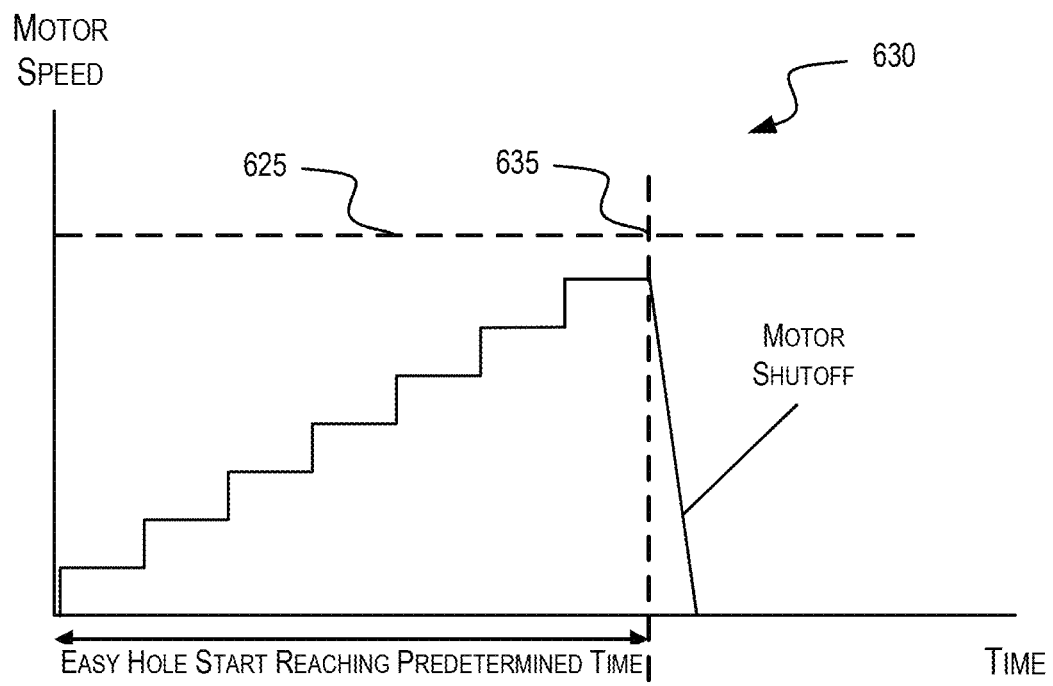

FIG. 6C shows a stepwise relationship of motor speed with time during an easy hole start operation 620, according to some embodiments. Upon actuation of the trigger 125 of the power tool 100, the motor speed starts at reduced speed value (e.g., 0%, 10% of full speed, etc.) and increases according to a step-wise function until it reaches a target speed value 625 (e.g., full speed, a desired speed set by the user, etc.). When the motor speed reaches the target speed value 625, the easy hole start operation ends. The motor speed persists at the target speed value 625 during target speed operation until the trigger 125 is released. FIG. 6D shows a stepwise relationship of motor speed with time during an easy hole start operation 630, according to some embodiments. Upon actuation of the trigger 125 of the power tool 100, the motor speed starts at a reduced speed value (e.g., 0%, 10% of full speed, etc.) and gradually increases according to a step-wise function until reaching a predetermined time threshold 635 (e.g., 120 seconds). When the predetermined time 635 is reached and the motor 400 has not reached the target speed value 625, the easy hole operation ends. For example, in response to reaching the predetermined time 635, the motor 400 is shut off.

Figure 6E:
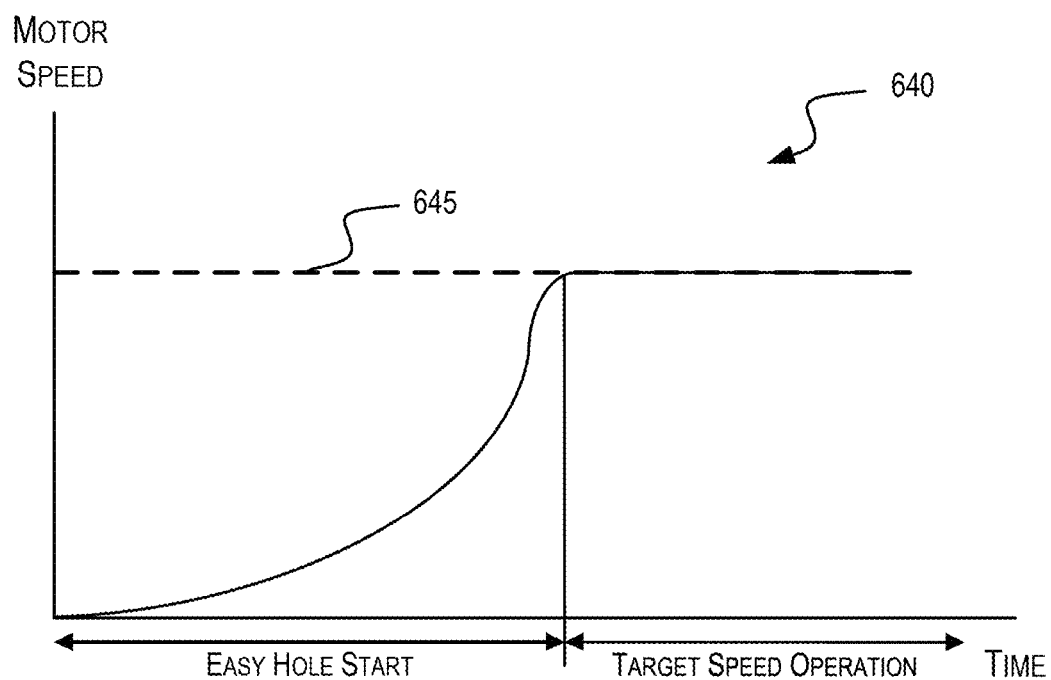
Figure 6F:
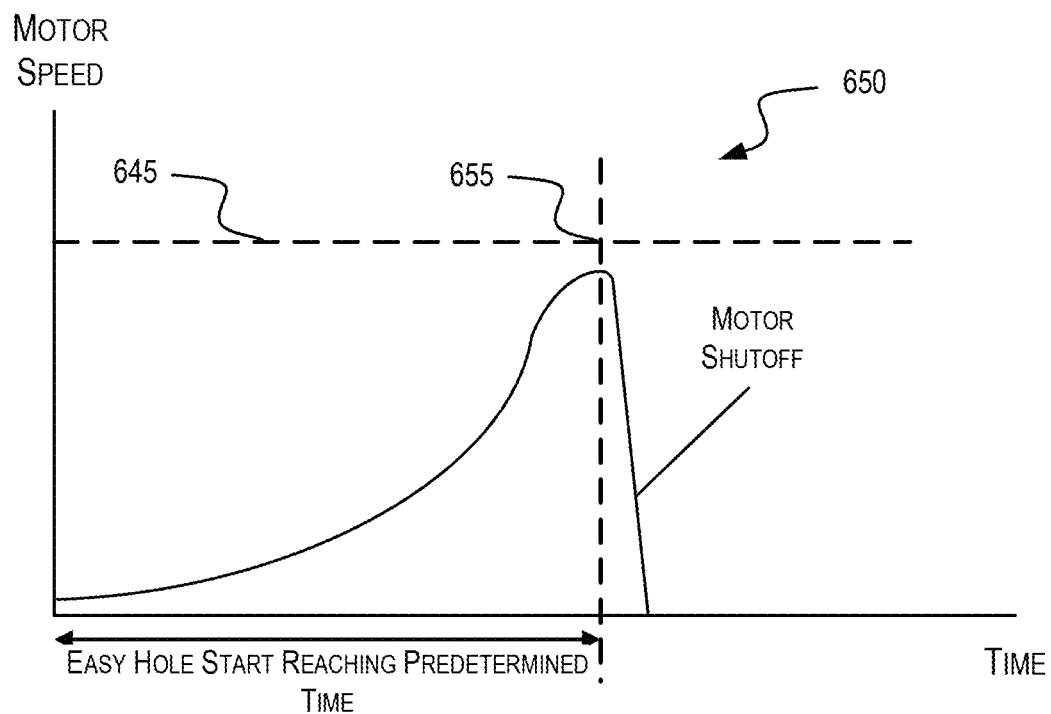

FIG. 6E shows a nonlinear (e.g., exponential, polynomial, etc.) relationship of motor speed with time during an easy hole start operation 640, according to some embodiments. Upon actuation of the trigger 125 of the power tool 100, the motor speed starts at a reduced speed value (e.g., 0%, 10% of full speed, etc.) and gradually increases at a nonlinear rate until it reaches a target speed value 645 (e.g., full speed, a desired speed set by the user, etc.). When the motor speed reaches the target speed value 645, the easy hole start operation ends. The motor speed persists at the target speed value 645 during target speed operation until the trigger 125 is released. FIG. 6F shows a non-linear relationship of motor speed with time during an easy hole start operation 650, according to some embodiments. Upon actuation of the trigger 125 of the power tool 100, the motor speed starts at a reduced speed value (e.g., 0%, 10% of full speed, etc.) and gradually increases at a nonlinear rate until reaching a predetermined time threshold 655 (e.g., 120 seconds). When the predetermined time 655 is reached, the easy hole operation ends. For example, in response to reaching the predetermined time 655, the motor 400 is shut off.

Figure 7:
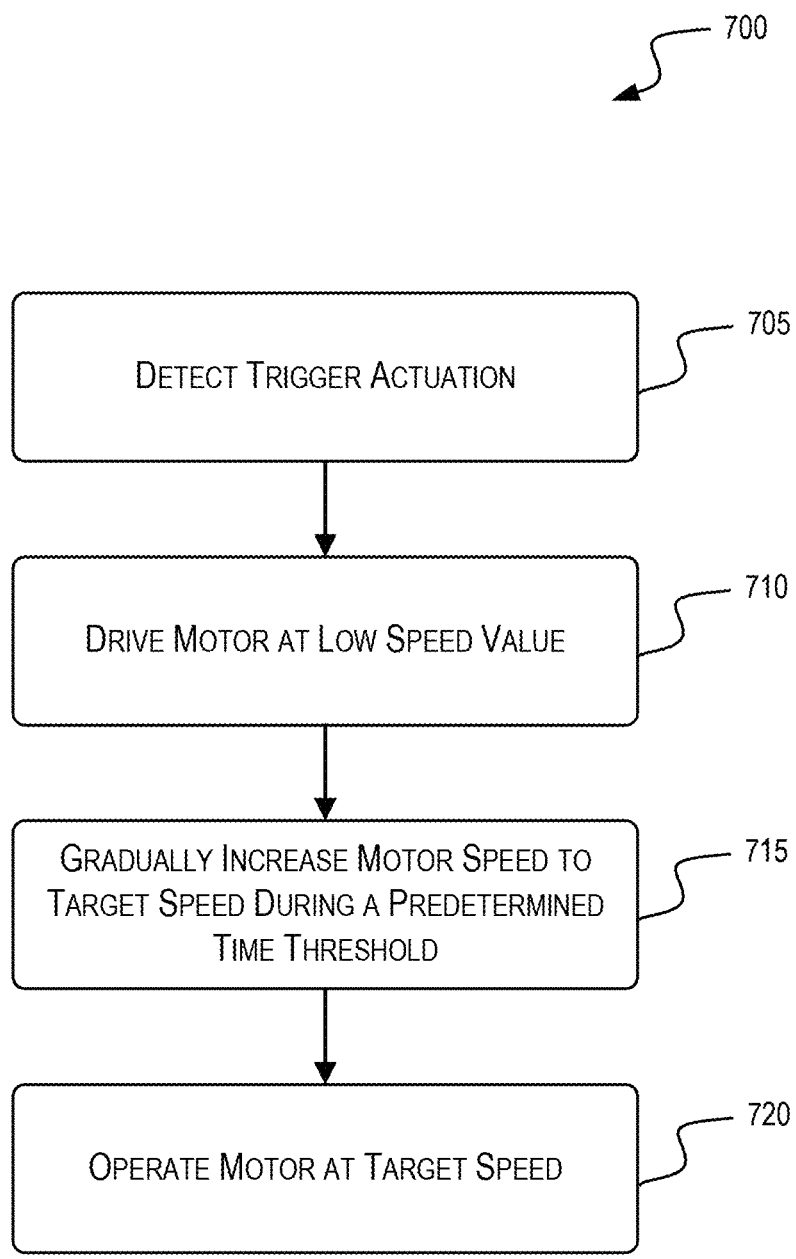
FIG. 7 illustrates a block diagram of a method of an easy hole start operation implemented by the controller of FIG. 3 in accordance with embodiments described herein.

FIG. 7 illustrates an easy hole start method 700 executed by the controller 300 of the power tool 100. At block 705, the controller 300 detects the actuation of the actuator or trigger 125 of the power tool 100. The actuation of the trigger 125 is when the user depresses the trigger 125. At block 710, the controller 300 drives the motor 400 at a low speed value. As previously described, the controller 300 sends control signals to the power switching network 365. The power switching network 365 includes a number of high side power switching elements 365A, 365B, 365C and a number of low side power switching elements 365D, 365E, 365F for driving the motor 400. The controller 300 sends a control signal to the power switching network 365 to initially drive the switching elements such that they drive the motor 400 in a range of, for example, 1%-15% of a full speed of the motor 400 during the easy hole start operation. The easy hole start operation may persist in the range of 10 to 150 seconds. At block 715, the controller 300 gradually increases the motor speed to a target speed value during a predetermined time period or threshold. In some embodiments, the speed of the motor 400 is gradually increased continuously during the easy hole start operation. As described above, the controller 300 may increase the speed linearly, according to a stepwise function, nonlinearly, etc. In some embodiments, the controller 300 continuously compares the instant speed of the motor to the target speed value during the gradual increase of the speed. For example, the controller 300 may compare the instant speed to the target speed to determine whether the instant speed has reached the target speed value. At block 720, the controller 300 operates the motor 400 at the target speed value. The controller 300 then operates the motor 400 at the target speed value until, for example, the trigger 125 is released.

Figure 8:
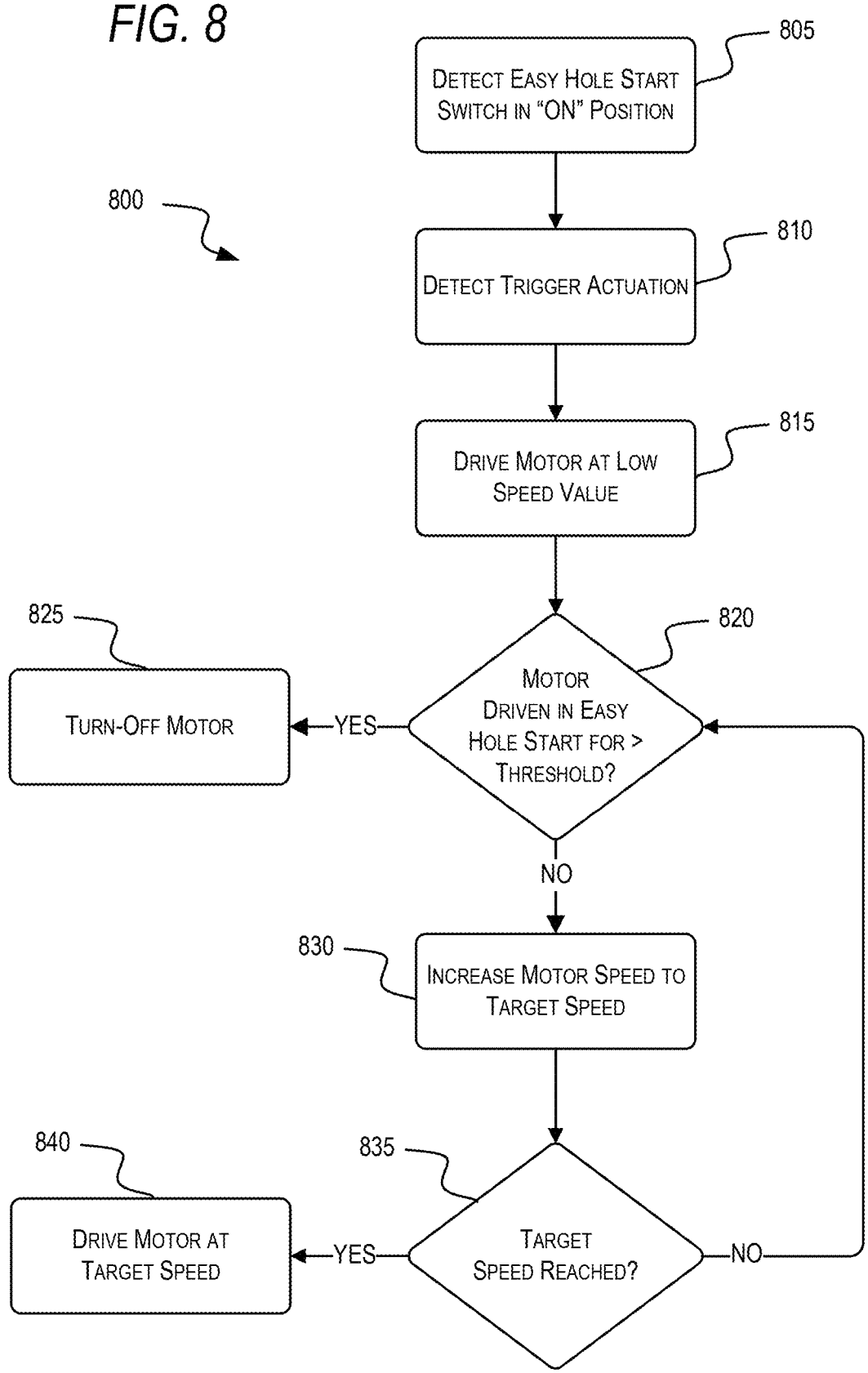
FIG. 8 illustrates a block diagram of a method of an easy hole start operation implemented by the controller of FIG. 3 in accordance with embodiments described herein.

FIG. 8 illustrates an easy hole start process or method 800 executed by the controller 300 of the power tool 100. At block 805, the controller 300 detects that the easy hole start switch 135 is in the ON position. As described above, the ON position may be when the easy hole start switch 135 is pressed or when the easy hole start switch 135 is slid to the ON position. At block 810, the controller 300 detects the actuation of the actuator or trigger 125 of the power tool 100. The actuation of the trigger 125 is when the user depresses the trigger 125. At block 815, the controller 300 drives the motor 400 at a low speed value. As previously described, the controller 300 sends control signals to the power switching network 365. The power switching network 365 includes a number of high side power switching elements 365A, 365B, 365C and a number of low side power switching elements 365D, 365E, 365F for driving the motor 400. The controller 300 sends a control signal to the power switching network 365 to drive the power switching elements such that they drive the motor 400 in a range of, for example, 1%-15% of a full speed of the motor 400 during the easy hole start operation. At block 820, the controller 300 compares the time the motor 400 has been driven during the easy hole start operation to a predetermined time threshold. The predetermined time threshold may be in a range of, for example, 10 to 150 seconds. If the motor 400 has been driven for a time greater than the predetermined time threshold without reaching the target speed, then the method proceeds to block 825. At block 825, then the motor 400 is turned off. If the motor 400 has not been driven for a time greater than the predetermined time threshold, then the method proceeds to block 830. At block 830, the motor speed is gradually increased to a target speed value. If, at block 835, the motor speed has not yet reached the target speed value, the method 800 returns to block 820. If, at block 835, the motor speed has reached the target speed value, the motor 400 is driven at the target speed value (block 840). The controller 300 can then operate the motor 400 at the target speed value until the trigger 125 is released.

Thus, embodiments described herein provide, among other things, systems and methods for performing an easy hole start operation for drilling power tools. Various features and advantages are set forth in the following claims.

What is claimed is:

1. A power tool comprising:
   a housing;
   a motor within the housing;
   a battery pack interface configured to receive a battery pack and provide power to the motor;
   an actuator movably coupled to the housing; and
   an electronic controller connected to the motor, the battery pack, and the actuator, the electronic controller configured to:
   detect that the actuator has been actuated,
   drive the motor at a first speed,
   increase a speed of the motor from the first speed to a target second speed until a predetermined time threshold is reached, wherein the predetermined time threshold is in a range of 10-150 seconds,
   compare the speed of the motor to the target second speed of the motor, and
   turn off the power tool when the predetermined time threshold is reached and if the speed of the motor has not reached the target second speed of the motor.

2. The power tool of claim 1, wherein the electronic controller is further configured to:
   determine, prior to detecting that the actuator has been actuated, that a second actuator has been actuated.

3. The power tool of claim 1, wherein the first speed is in a range of 0%-15% of a full speed of the motor.

4. The power tool of claim 1, wherein the motor is driven using pulse width modulation (PWM) signals.

5. The power tool of claim 1, wherein the actuator is a trigger.

6. The power tool of claim 1, wherein the speed of the motor is increased in a linear manner.

7. The power tool of claim 1, wherein the power tool is a drill.

8. A method for controlling operation of a power tool, the method comprising:
   detecting, by a motor controller of the power tool, that an actuator of the power tool has been actuated;
   driving, by the motor controller, a motor of the power tool at a first speed;
   increasing, by the motor controller, a speed of the motor from the first speed to a target second speed until a predetermined time threshold is reached, wherein the predetermined time threshold is in a range of 10-150 seconds;
   comparing, by the motor controller, the speed of the motor to the target second speed of the motor; and
   turning off, by the motor controller, the power tool when the predetermined time threshold is reached and if the speed of the motor has not reached the target second speed of the motor.

9. The method of claim 8 further comprising:
   determining, by the motor controller, prior to detecting that the actuator has been actuated, that a second actuator has been actuated.

10. The method of claim 8, wherein the first speed is in a range of 0%45% of a full speed of the motor.

11. The method of claim 8, wherein the motor is driven using pulse width modulation (PWM) signals.

12. The method of claim 8, wherein the speed of the motor is increased in a linear manner.

13. A power tool comprising:
    a housing;
    a motor within the housing;
    a battery pack interface configured to receive a battery pack and provide power to the motor;
    an actuator movably coupled to the housing;
    a switch coupled to the housing, the switch being movable between a first position and a second position; and
    an electronic controller connected to the motor, the battery pack, and the actuator, the electronic controller configured to:
    detect that the switch is in the first position,
    detect that the actuator has been actuated,
    drive the motor at a first speed,
    increase a speed of the motor to a target second speed during a predetermined time threshold, wherein the predetermined time threshold is in a range of 10 seconds to 150 seconds,
    compare the speed of the motor to the target second speed of the motor, and
    turn off the power tool when the predetermined time threshold is reached and if the speed of the motor has not reached the target second speed of the motor.

14. The power tool of claim 13, further comprising a user interface.

15. The power tool of claim 13, wherein the first speed is in a range of 0%-15% of a full speed of the motor.

16. The power tool of claim 13, wherein the speed of the motor is increased in a linear manner.

17. The power tool of claim 14, wherein the user interface is configured to set the first speed, the target second speed, and the predetermined time threshold.

* * * * *